United States Patent [19]

Martin et al.

[11] Patent Number: 5,015,717
[45] Date of Patent: May 14, 1991

[54] SULFUR-CONTAINING ORGANOPOLYSILOXANE WAXES AND A METHOD FOR PREPARING THE SAME

[75] Inventors: Eugene R. Martin, Onsted; Roy M. Griswold, Hudson, both of Mich.

[73] Assignee: Wacker Silicones Corporation, Adrian, Mich.

[21] Appl. No.: 371,132

[22] Filed: Jun. 26, 1989

Related U.S. Application Data

[60] Continuation of Ser. No. 197,223, Apr. 18, 1988, abandoned, which is a division of Ser. No. 945,124, Dec. 22, 1986, abandoned.

[51] Int. Cl.$^5$ .............................................. C08G 77/28
[52] U.S. Cl. ...................................... 528/30; 528/12; 528/24; 528/25; 556/428; 556/419
[58] Field of Search ................... 528/30, 24, 12, 25; 556/427, 428, 429

[56] References Cited

U.S. PATENT DOCUMENTS

| | | | |
|---|---|---|---|
| 4,046,795 | 9/1977 | Martin | 528/12 |
| 4,125,552 | 11/1978 | Speier | 556/428 |
| 4,230,816 | 10/1980 | Martin | 556/429 |
| 4,251,277 | 2/1981 | Martin | 556/429 |
| 4,252,932 | 2/1981 | Homer et al. | 528/30 |
| 4,595,740 | 6/1986 | Panster | 528/30 |
| 4,622,412 | 11/1986 | Piskoti | 556/429 |

OTHER PUBLICATIONS

Loudon, G. M., *Organic Chemistry*, N.Y., Addison-Wesley Publishing Company, 1984, pp. 771–772.
Streitwieser, Jr. et al., "Introduction to Organic Chemistry", 2nd Edition, MacMillan Publishing Co., Inc., 1981, p. 69.

Primary Examiner—Melvin I. Marquis
Assistant Examiner—Ralph H. Dean, Jr.

[57] ABSTRACT

This invention relates to sulfur containing organopolysiloxane waxes containing (1) at least three mole percent of siloxane units of the formula

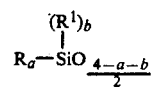

(2) at least one mole percent of siloxane units selected from the formulas

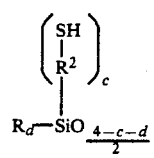

and

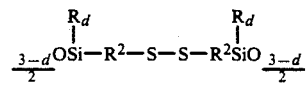

(3) and from 0 to 96 mole percent of siloxane units have the formula

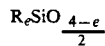

where R is a monovalent hydrocarbon radical having from 1 to 10 carbon atoms, $R^1$ is an alkyl radical linked to silicon having an average of at least 25 carbon atoms, $R^2$ is a multivalent radical selected from a hydrocarbon radical having from 2 to 10 carbon atoms which is free of aliphatic unsaturation, a hydrocarbon ether or a hydrocarbon thioether, a is an integer of from 0 to 2, b is an integer of 1 or 2, c is an integer of 1 or 2, d is an integer of from 0 to 2, e is an integer of from 0 to 3, and the sum of a+b is 1, 2 or 3, and the sum of c+d is 1, 2 or 3.

6 Claims, No Drawings

SULFUR-CONTAINING ORGANOPOLYSILOXANE WAXES AND A METHOD FOR PREPARING THE SAME

This is a continuation of application Ser. No. 197,223, filed Apr. 18, 1988, now abandoned, which is a division of application Ser. No. 945,124, filed Dec. 22, 1986, now abandoned.

The present invention relates to organopolysiloxane waxes, particularly to sulfur containing organopolysiloxane waxes and more particularly to a method for preparing sulfur containing organopolysiloxane waxes which are solid at room temperature.

BACKGROUND OF THE INVENTION

Liquid mercaptoalkylpolysiloxanes are well known and are described, for example, in U.S. Pat. No. 3,346,405 to Viventi, in which the mercaptoalkyl substituted organopolysiloxanes are prepared by reacting sodium sulfohydride with the w-chloroalkyl substituent of an organopolysiloxane.

Berger describes a method for preparing mercaptoalkyl organosilanes in U.S. Pat. No. 3,565,937, in which a silicon hydride group is added across the double bond of sulfur-substituted olefins.

Musolf et al discloses a process for preparing liquid polymercaptoorganosiloxanes in U.S. Pat. No. 3,388,144, in which silanes or siloxanes containing one or two unsaturated groups per silicon atom are reacted with a polymercaptocarbon compound in the presence of a catalyst.

Martin discloses mercaptoalkylpolysiloxanes in U.S. Pat. No. 4,046,795, in which the alkyl radicals may have up to 18 carbon atoms. These mercaptoalkylpolysiloxanes are soft solids and, therefore, cannot be pulverized to form flowable powders.

These liquid mercaptoalkylpolysiloxanes have been used as release agents in molding plastics such as polyurethanes in metallic molds. They are generally dispersed in a solvent and sprayed on the surfaces of metallic molds and upon drying an uneven coating of siloxane is obtained.

Surprisingly, it has been found that when solutions of solid sulfur containing organopolysiloxanes are applied on mold surfaces a more uniform coating is obtained which gives a greater number of releases.

Therefore, it is an object of the present invention to provide sulfur containing organopolysiloxane waxes. Another object of the present invention is to provide sulfur containing organopolysiloxane waxes having an alkyl group with an average of at least 25 carbon atoms. Still another object of the present invention is to provide hard sulfur containing organopolysiloxane waxes which can be pulverized to powders. A further object of the present invention is to provide mixtures of solid sulfur containing organopolysiloxane waxes and organic waxes having melting points greater than 55° C.

SUMMARY OF THE INVENTION

The foregoing objects and others which will become apparent from the following description are accomplished in accordance with this invention, generally speaking, by providing sulfur containing organopolysiloxane waxes containing (1) at least three mole percent of siloxane units of the formula

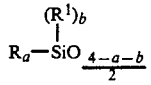

(2) at least one mole percent of siloxane units selected from the formulas

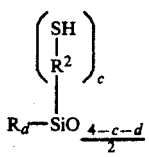

and

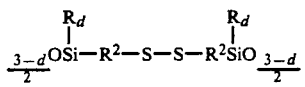

and (3) from 0 to 96 mole percent of siloxane units have the formula

where R is a monovalent hydrocarbon radical having from 1 to carbon atoms, $R^1$ is an alkyl radical linked to silicon with an SiC-bond which has at an average of least 25 carbon atoms, $R^2$ is a multivalent radical selected from a hydrocarbon radical having from 2 to 10 carbon atoms which is free of aliphatic unsaturation, a hydrocarbon ether or a hydrocarbon thioether, a is an integer of from 0 to 2 and b is an integer of 1 or 2, c is an integer of 1 or 2, d is an integer of from 0 to 2, e is an integer of from 0 to 3, and the sum of $a+b$ is 1, 2 or 3, and the sum of $c+d$ is 1, 2 or 3.

DESCRIPTION OF THE INVENTION The sulfur containing organopolysiloxane waxes of this invention preferably contain (1) from 3 to 99 mole percent and more preferably from 5 to 99 mole percent of siloxane units of the formula

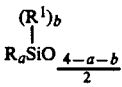

and (2) from 1 to 97 mole percent of siloxane units selected from the formulas

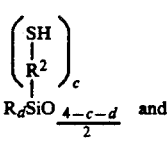

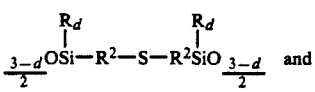

(3) from 0 to 96 mole percent of siloxane units of the formula $$R_eSiO_{\frac{4-e}{2}}$$

where R, $R^1$, $R^2$, a, b, c, d and e are the same as above.

The sulfur containing organopolysiloxane waxes of this invention are prepared by reacting an alkyl functional silane of the formula $$R_aSi(R^3)_{4-a-b} \overset{(R^1)_b}{|}$$

with a mercaptosilane of the formula $$\left( \begin{array}{c} SH \\ | \\ R^2 \\ | \end{array} \right)_c R_dSi-(R^3)_{4-c-d}$$

in the presence of water and solvent, in which R, $R^1$, $R^2$, a, b, c and d are the same as above, and $R^3$ is a hydrocarbonoxy radical (OR) having up to 10 carbon atoms or halogen, such as chlorine, bromine, or iodine. When $R^3$ is a hydrocarbonoxy radical, then an acid catalyst having a pKa value of less than 1 must be employed.

Other silicone compounds which may be employed in the reaction are cyclic trisiloxanes of the formula $$(R_2SiO)_3$$

and/or organodisiloxanes of the formula $$(R_3Si)_2O$$

where R is the same as above.

Specific examples of monovalent hydrocarbon radicals represented by R which have from 1 to 10 carbon atoms are alkyl radicals such as methyl, ethyl, propyl, butyl, octyl and decyl radicals; aryl radicals such as the phenyl radical; cycloalkyl radicals such as the cyclobutyl, cyclopentyl and cyclohexyl radicals; alkaryl radicals such as the tolyl, xylyl, ethylphenyl radicals and aralkyl radicals such as benzyl, alpha-phenylethyl, beta-phenylethyl and alpha-phenylbutyl radicals.

Examples of alkyl radicals represented by $R^1$ having at least 25 carbon atoms and up to about 60 carbon atoms are pentacosenyl, hexacosenyl, octacosenyl, triacontenyl, dotriacontenyl, tetracontenyl, pentacontenyl, hexacontenyl and the like.

Examples of multivalent hydrocarbon radicals represented by $R^2$ having from 2 to 10 carbon atoms, which are free of aliphatic unsaturation are divalent hydrocarbon radicals such as ethylene, trimethylene, tetramethylene, hexamethylene, octamethylene, and decamethylene radicals. Examples of tri-and tetra-valent hydrocarbon radicals represented by $R^2$ are those of the formula

=CHCH$_2$—, =CHCH$_2$CH$_2$—, =CH(CH$_2$)$_3$—,

=CH(CH$_2$)$_4$—, =CH(CH$_2$)$_8$, =C(CH$_3$)CH$_2$—,

=C(C$_2$H$_5$)(CH$_2$)$_2$—, ≡CCH$_2$—, ≡C(CH$_2$)$_4$—,

≡C(CH$_2$)$_8$—, ≡CCH(CH$_3$)CH$_2$— and
≡CCH(C$_2$H$_5$)(CH$_2$)$_3$—

Examples of suitable divalent hydrocarbon ether and hydrocarbon thioether radicals represented by $R^2$ are those having the formula (—XC$_2$H$_4$)$_m$, (—XC$_2$H$_4$XCH$_2$)$_m$ and (—XC$_3$H$_6$)$_m$, in which X is oxygen or sulfur and m is a number of from 1 to 50. Specific examples of hydrocarbon ether and hydrocarbon thioether radicals are ethylene oxide, trimethylene oxide and polymers thereof as well as the sulfur analogues of the hydrocarbon ethers.

Examples of hydrocarbonoxy radicals represented by $R^3$ having up to 10 carbon atoms are methoxy, ethoxy, propoxy, butoxy, octoxy and decoxy radicals.

The halogen atoms represented by $R^3$ are chlorine, bromine and iodine, with chlorine being the preferred halogen atom.

Examples of suitable alkyl functional silanes which are reacted with the mercaptosilanes are those of the formula $$\overset{CH_3}{\underset{|}{(CH_3O)_2SiC_{25}H_{51}}}, \overset{C_2H_5}{\underset{|}{(C_2H_5O)_2SiC_{26}H_{53}}}, \overset{CH_3}{\underset{|}{(C_3H_6O)_2SiC_{28}H_{57}}},$$

$$\overset{CH_3}{\underset{|}{(CH_3O)_2SiC_{30}H_{61}}}, (CH_3O)_3SiC_{32}H_{65}, \overset{C_2H_5}{\underset{|}{(C_2H_5O)_2SiC_{36}H_{73}}},$$

$$\overset{CH_3}{\underset{|}{(C_3H_7)_2SiC_{40}H_{81}}}, (CH_3O)_3SiC_{45}H_{91}, (CH_3O)_3SiC_{50}H_{101},$$

$$\overset{CH_3}{\underset{|}{(CH_3O)_2SiC_{52}H_{105}}}, \overset{CH_3}{\underset{|}{ClSiC_{26}H_{53}}}, \overset{CH_3}{\underset{|}{Cl_2SiC_{28}H_{57}}}$$

and the like.

The alkyl functional silanes may be prepared by reacting an olefinic hydrocarbon or mixtures thereof having an average of at least 25 carbon atoms with a silane having at least one Si-bonded hydrogen atom in the presence of a catalyst which promotes the addition of the Si-bonded hydrogen to an aliphatically unsaturated group. The addition of a silane having at least one silicon bonded atom to a hydrocarbon having olefinic unsaturation is described in U.S. Pat. No. 2,823,218 to Speier et al; U.S. Pat. No. 3,159,662 to Ashby; U.S. Pat. No. 3,220,972 to Lamoreaux; U.S. Pat. No. 3,474,123 to Kelly et al; U.S. Pat. No. 3,798,252 to Nitzsche et al; U.S. Pat. No. 3,795,656 to Martin; and U.S. Pat. No. 4,394,317 to McAfee et al.

Examples of olefinic hydrocarbons having at least 25 carbon atoms are mono-olefinic hydrocarbons such as 2-pentacosene, 1-hexacosene, 2-heptacosene, 3-octacosene, 1-nonacosene, 3-triacontene, 1-hentriacontene, 1-dotriacontene, 3-triacontene, 4-tetracontene, 2-pentacontene and 1-hexacontene. These olefin hydrocarbons may be used alone or in admixture with other olefinic hydrocarbons having at least 25 carbon atoms per molecule.

The silanes which are reacted with the olefinic hydrocarbon may be represented by the formula $$(H)_b-\overset{R_a}{\underset{|}{Si}}-R^3_{4-a-b}$$

where R, $R^3$, a and b are the same as above and $R^3$ is a hydrocarbonoxy radical having from 1 to 10 carbon atoms or halogen. When $R^3$ is a halogen atom, the halogen containing alkyl functional silane may be converted to alkoxy containing alkyl functional silanes by reacting the halogen containing alkyl functional silanes with an excess of alcohol at temperatures ranging from about 40° C. to about 150° C. In the course of the reaction, a hydrohalide is liberated and often tends to react with some of the alcohol to form organic halides in water. Oftentimes, a base such as pyridine or trimethylamine may be added to the mixture as a hydrogen halide acceptor and the resultant base-hydrohalide filtered off at the end of the reaction. Another method which may be employed is to blow hot vapor of an alcohol up through a packed column down through which the chlorosilane passes in liquid form and the hydrogen chloride is liberated and removed from the top of the column.

Examples of mercaptofunctional silanes having the formula

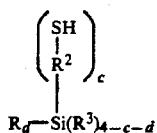

where R, $R^2$, $R^3$, c and d are the same as above, which are reacted with the alkyl functional silanes are 3-mercaptopropyltrimethoxysilane, 2-mercaptoethyltriethoxysilane, gammamercaptodecyltriethoxysilane, 2-mercaptohexyltripropoxysilane, gamma-mercaptoamyltriethoxysilane, 2-(triethoxysilyl)ethylbutyl thioether, 3-(triethoxysilyl)propylbutyl thioether, 4-(triethoxysilyl)-butylmethyl thioether, 2-(methyldiethoxysilyl)ethylmethyl thioether, 2-(methyldiethoxysilyl)ethylphenyl thioether, 2-(methyldiethoxysilyl)ethyldodecyl thioether, 6-(trimethoxysilyl)hexylethyl thioether.

Examples of suitable disiloxanes which may be employed in the reaction are hexamethyldisiloxane, hexaethyldisiloxane, hexapropyldisiloxane, hexaoctyldisiloxane and hexadecyldisiloxane.

Examples of suitable cyclic siloxanes which may be employed in the reaction are hexamethylcyclotrisiloxane, hexaethylcyclotrisiloxane, hexaphenylcyclotrisiloxane, hexabutylcyclotrisiloxane, hexaoctylcyclotrisiloxane, 1,3,5-trimethyl, 1,3,5-triphenylcyclotrisiloxane and the like.

Catalysts which may be employed in effecting the reaction between the alkyl functional silanes and the mercaptosilanes in preparing the sulfur containing organopolysiloxane waxes are acid clays, organic and inorganic acids having a pKa value of less than 1.0 and more preferably below about 0.7 in aqueous solutions. Suitable acid catalysts which may be employed are benzosulfonic acid, paratoluene sulphonic acid, sulfuric acid, sulfurus acid, nitric acid, perchloric acid, hydrochloric acid and acid clays, such as Filtrol No. 13 and No. 24 (available from Filtrol Corporation).

The amount of catalyst employed in the reaction is not critical; however, it is preferred that from about 0.01 to about 10 percent by weight of catalyst, based on the total weight of the silicon compounds used in the preparation of the sulfur containing organopolysiloxane waxes, be employed. Although greater amounts of catalyst may be used, it is preferred that the catalyst be present in an amount of from about 0.1 to about 8 percent and more preferably from about 1 to 5 percent by weight, based on the weight of the silicon containing compounds used in the preparation of the sulfur containing organopolysiloxane waxes.

The reaction between an alkyl functional silane and the mercaptosilane in the presence of water and catalyst may be conducted at a temperature of from about 40° C. up to about 250° C., and more preferably from about 50° to 200° C. The order of addition of the reactants is not critical; however, it is preferred that the reaction be carried out at reflux temperature under atmospheric pressure, although higher or lower pressures may be employed. The reaction generally takes from about 1 to 6 hours and the volatile products are generally removed as they are formed during refluxing. When the reaction is complete, a filter aid such as celite is generally added to aid in the filtration and the resultant filtrate is vacuum stripped at a temperature of from about 125° up to about 200° C. at about 1 torr.

The reaction may be conducted in the presence or absence of an organic solvent, although it is preferred that it be conducted in the presence of a hydrocarbon solvent. Examples of suitable hydrocarbon solvents are aromatic hydrocarbons including benzene, toluene and xylene. Aliphatic hydrocarbon solvents such as hexane, heptane, octane, and aliphatic mineral spirits may be employed. The amount of solvent employed may range from about 1 to 50 percent by weight based on the weight of the silicon reactants.

The amount of water employed in the reaction is not critical and may range from about 0.5 mols of water per mol of alkoxy group and/or halogen atom present on the silicon compounds up to about 50 mols of water per mol of alkoxy group and/or halogen atom present on the silicon compounds. It is preferred that from about 0.5 to 30 and more preferably from about 1 to 20 mols of water be employed per mol of alkoxy group and/or halogen atom present on the silicon compounds.

In preparing the sulfur containing organopolysiloxane waxes, the mole ratio of alkyl functional silane to mercapto-functional silane may range from about 0.08 to 100 moles of alkyl functional silane per mole of mercaptofunctional silane, and more preferably from about 1 to about 20 moles of alkyl functional silane per mole of mercaptofunctional silane. In addition, the mole ratio of organocyclotrisiloxane may range from about 0 to 32 moles per mole of mercaptosilane and more preferably from about 1 to 10 moles of organocyclotrisiloxane per mole of mercaptosilane. The amount of organodisiloxane present in the reaction may range from about 0 to 18 moles, and more preferably from about 1 to 10 moles of organodisiloxane per mole of mercaptosilane. In addition, it has been found that an excess of olefinic hydrocarbons having at least an average of 25 carbon atoms may be employed in the reaction in order to provide improved properties. The amount of olefinic hydrocarbon which may be present in the reaction may range from about 0 to 90 weight percent of olefinic hydrocarbons based on the weight of the silicon containing compounds and more preferably from about 10 to 75 percent based on the weight of the silicon containing compounds.

These sulfur containing organopolysiloxane waxes may be combined with organic waxes to form compositions which may be easily pulverized.

Examples of suitable organic waxes which may be combined with the sulfur containing organopolysiloxane waxes are animal waxes such as beeswax, spermaceti, lanolin, shellac wax; vegetable waxes, such as carnauba, candelilla, bayberry, sugar cane and synthetic waxes such as ethylenic waxes, including microcrystalline wax.

Other organic waxes which may be employed are stearyl alcohol, behenyl alcohol, octadecane, eicosane, triacontane and triacontene.

Generally, the sulfur containing organopolysiloxane wax is blended with the organic wax by melting the organic wax and then dispersing the sulfur containing organopolysiloxane wax in the molten organic wax.

The sulfur containing waxes may also be dispersed in the organic waxes by dissolving the wax in a solvent and then adding the sulfur containing organopolysiloxane wax to the solvent solution with agitation.

Solvents which may be employed to dissolve the waxes are hydrocarbon solvents such as hexane, heptane, octane; chlorinated hydrocarbons such as perchloroethane, methyl chloroform, methylene chloride and aromatic hydrocarbons such as benzene, toluene and xylene as well as naphtha and petroleum spirits.

The sulfur containing organopolysiloxane waxes of this invention may be oxidized to form the dissulfides at elevated temperatures, e.g., 125° to 250° C. in the presence of oxygen.

Oxidizing agents which may be employed are iodine, chlorine, and elemental sulfur. Stronger oxidizing agents such as hydrogen peroxide, sodium hypochlorite, peracids and the like may also be employed to form the disulfides. The oxidation is greatly accelerated in an alkaline medium.

The sulfur containing organopolysiloxane waxes of this invention may be diluted with organic solvents to form a solution containing from 0.1 percent to 99 percent, and more preferably from 1.0 to 20 percent by weight based on the weight of the composition, i.e., solvent and the sulfur containing alkylpolysiloxane waxes.

Suitable examples of organic solvents are aliphatic hydrocarbons such as hexane, heptane, octane; aromatic hydrocarbons such as benzene, toluene, xylene, ethylbenzene, naphtha; halogenated hydrocarbons such as methylene chloride, perchloroethylene, trichloroethylene, carbon tetrachloride; ethers and polyethers such as diethylether, dimethylether, dibutylether, diethylene glycol dimethylether, diethylene glycol diethyl ether and the like. Preferably, the solvent employed in this invention is a methylene chloride or perchloroethylene.

It is possible, although not preferred to prepare the sulfur containing organopolysiloxane waxes in the presence of the organic waxes by adding the alkyl functional silane, mercaptosilane, water and catalyst to a molten organic wax which has been heated to an elevated temperature with agitation. Other siloxanes such as the cyclic siloxane and/or disiloxane may also be added to the molten wax. It is preferred that the reaction be conducted under high speed agitation in order that the sulfur containing organopolysiloxane wax will be dispersed in the organic wax.

The amount of organic wax employed may vary over a wide range. For example, the amount of sulfur containing organopolysiloxane wax to organic wax may range from 5 to 95 percent by weight of sulfur containing organopolysiloxane wax based on the weight of the organopolysiloxane wax and the organic wax and more preferably from 30 to 75 percent by weight based on the weight of the sulfur containing organopolysiloxane wax and the organic wax.

The compositions of this invention may be used as a mold release composition and may be applied to a mold surface by any method known in the art, such as spraying, dipping, wiping or brushing. It is preferred that the solvent be removed before the mold is used. The compositions of this invention may be applied to metal substrates which are used for molding thermoplastic and thermosetting materials such as polyurethanes, polyethylene, epoxy resins and the like. In addition, the sulfur containing waxes may be pulverized into powders and mixed with thermoplastic and thermosetting polymers such as polyethylene, polypropylene, polycarbonates, polyvinyl chloride, silicone resins, polyurethanes, epoxy resins, polyacrylates and polymethacrylates.

The embodiments of this invention are further illustrated by the following examples in which all parts are by weight unless otherwise specified.

EXAMPLE 1

A mercaptopolysiloxane copolymer is prepared by adding to a reactor equipped with a stirrer, condenser, thermometer and moisture trap, 75 parts of a silane of the formula $$C_nH_{2n+1}Si(OCH_3)_3$$

where n has an average value of 45, 6.5 parts of 3-mercaptopropyltrimethoxysilane, 12.4 parts of hexamethylcyclotrisiloxane, 5.9 parts of hexamethyldisiloxane and 100 parts of heptane and then heating the reactants to a temperature of 61° C. About 81.5 parts of water and 2 parts of acid clay (available from Filtrol Corporation as Filtrol-13) are then added to the reactor. The reactants are heated to a temperature of about 150° C., while removing the aqueous portion of the azeotrope. The contents of the reactor are cooled to about 50° C., then about 10 parts of celite are added and the mixture filtered.

The filtrate is then vacuum stripped up to 125° C. at less than 1 torr. The resultant wax melts at 58° C. and has an SH content of 0.095 weight percent.

EXAMPLE 2

To a reactor equipped with a stirrer, condenser, thermometer and moisture trap are added 75 parts of a silane of the formula $$C_nH_{2n+1}Si(OCH_3)_3$$

where n has an average value of 45, 70 parts of 3-mercaptopropyltrimethoxysilane, 12.4 parts of hexamethylcyclotrisiloxane, 5.9 parts of hexamethyldisiloxane and 100 parts of heptane and heated to 67° C. About 100 parts of water and 7 parts of acid clay (available from Filtrol Corporation as Filtrol No. 13) are then added. The reactants are heated to a temperature of about 150° C., while removing the aqueous portion of the azeotrope. The contents of the reactor are then cooled to about 50° C., then about 10 parts of celite are added and the mixture filtered. The filtrate is then vacuum stripped up to about 145° C. at less than 1 torr. The resultant wax has an SH content greater than 2 weight percent.

EXAMPLE 3

To a reactor equipped with a stirrer, condenser, thermometer and moisture trap are added 450 parts of a silane of the formula $$C_nH_{2n+1}Si(OCH_3)_3$$

where n has an average value of 30, 39 parts of 3-mercaptopropyltrimethoxysilane, 74.4 parts of hexamethylcyclotrisiloxane, 35.4 parts of hexamethyldisiloxane and 650 parts of heptane. After heating the reactants to a temperature of 70° C., about 489 parts of water and 12 parts of acid clay (available from Filtrol Corporation as Filtrol No. 13) are then added to the reactor. The reactants are then heated to a temperature of about 140° C. while removing the aqueous portion of the azeotrope. The contents of the reactor are cooled to about 50° C., then about 10 parts of celite are added and the mixture filtered. The filtrate is then vacuum stripped up to about 150° C. at less than 1 torr. The resultant wax has a melting point range of from 44 to 74° C. and contains about 0.6 weight percent SH.

EXAMPLE 4

To a reactor equipped with a stirrer, condenser, thermometer and moisture trap are added 606 parts of a silane of the formula

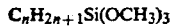
$$C_nH_{2n+1}Si(OCH_3)_3$$

where n has an average value of 30, 52 parts of 3-mercaptopropyltrimethoxysilane, 101 parts of hexamethylcyclotrisiloxane, 47 parts of hexamethyldisiloxane and 141 parts of heptane. The contents of the reactor are heated to a temperature of 69° C., then 300 parts of water and 36 parts of acid clay (available from Filtrol Corporation as Filtrol No. 13) are then added to the reactor and heated to a temperature of 130° C. while removing the aqueous portion of the azeotrope. The contents of the reactor are cooled to about 50° C., then about 10 parts of celite are added and the mixture filtered. The filtrate is then vacuum stripped to 180° C. at about 0.8 torr. The resultant wax has a melting point range of from 35° to 75° C. and an SH content of 0.44 weight percent.

EXAMPLE 5

To a reactor equipped with a stirrer, condenser, thermometer and moisture trap are added 714 parts of a silane of the formula

$$C_nH_{2n+1}Si(CH_3)(OCH_3)_2$$

where n has an average value of 45, 192 parts of 3-mercaptopropyltrimethoxysilane, 81.4 parts of hexamethyldisiloxane and 80 parts of xylene. The contents of the reactor are heated to about 70° C., then 200 parts of water and 20 parts of acid clay (available from Filtrol Corporation as Filtrol No. 13) are added and heated to a temperature of about 147° C. while removing the aqueous portion of the azeotrope. The contents of the reactor are cooled to about 50° C., then about 10 parts of celite are added and the mixture filtered. The filtrate is then vacuum stripped up to a temperature of about 149° C. at less than 1 torr. The resultant wax has a melting point range of from 34° to 80° C. and has an SH content of 3.92 weight percent.

EXAMPLE 6

To a reactor equipped with a stirrer, condenser, thermometer and moisture trap are added 606 parts of a silane of the formula

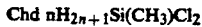
$$C_nH_{2n+1}Si(CH_3)Cl_2$$

where n has an average value of 45, 85 parts of 3-mercaptopropyltrimethoxysilane, 47 parts of hexamethyldisiloxane and 65 parts of xylene and heated to reflux temperature. About 100 parts of water and 5 parts of acid clay (available from Filtrol Corporation as Filtrol No. 13) are then added to the reactor. The contents of the reactor are then heated while removing the aqueous portion of the azeotrope. The contents of the reactor are cooled to about 80° C., then about 10 parts of celite are added and the mixture filtered. The filtrate is vacuum stripped up to a temperature of about 170° C. at less than 1 torr. The resultant wax has a melting point range of from 64° to 68° C. and has an SH content of 1.42 weight percent. Nuclear Magnetic Resonance Analysis of the product shows a ratio of $CH_2$ to $OSiCH_2$ of 1 to 30.

EXAMPLE 7

(A) To a flask equipped with an agitator, addition funnel and a caustic trap, is added 200 parts of toluene and 253.8 parts of iodine. About 196.3 parts of gamma-mercapto trimethoxysilane is added dropwise to the flask over a 2 hour period which is blanketed with an inert atmosphere. After the evolution of hydrogen iodide ceases the addition funnel is replaced with a nitrogen sparge. The solution is sparged with nitrogen for 2 hours and the product devolatilized at 75° C. at less than 1 torr.

(B) To a flask equipped with an agitator and a moisture trap, is added 100.0 parts of hexamethylcyclotrisiloxane, 478.6 parts of a silane of the formula

$$C_nH_{2n+1}Si(CH_3)(OCH_3)_2$$

where n has an average value of 45, 235.7 parts of the product from (A) above, 81.4 parts of hexamethyldisiloxane and 80.0 parts of xylene. The reaction mixture is heated to 65° C. and 200.0 parts of water and 20.0 parts of acid clay (Filtrol-13, available from Filtrol Corporation) are added. The volatile materials are azeotroped to a temperature of 150° C., then cooled and the product is filtered and devolatized at 180° C. at less than 1 torr. The product has a melting point greater than 40° C. and an SH content of 1.2 weight percent.

EXAMPLE 8

(A) Preparation of mercaptopolysiloxane copolymer

A mercaptopolysiloxane wax is prepared by adding to a reactor equipped with a stirrer, condenser, thermometer and moisture trap, 71.4 parts of a silane of the formula

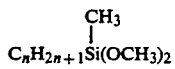
$$\begin{array}{c} CH_3 \\ | \\ C_nH_{2n+1}Si(OCH_3)_2 \end{array}$$

where n has an average value of 45, 19.2 parts of 3-mercaptopropyltrimethoxysilane, 10 parts of hexamethylcyclotrisiloxane, 8.1 parts of hexamethyldisiloxane and 8 parts of xylene and then heating the reactants to a temperature of 70° C. About 20 parts of water and 2 parts of acid clay (available from Filtrol Corporation as Filtrol-13) are then added to the reactor. The reactants are heated to a temperature of about 149° C., while removing the azeotrope. The contents of the reactor are cooled to about 50° C., then about 10 parts of celite are added and the mixture filtered.

The filtrate is then vacuum stripped up to 125° C. at less than 1 torr. The resultant product melts at a temperature of from 34° to 80° C. and has an SH content of 3.92 weight percent.

(B) Preparation of sulfur containing organopolysiloxane wax and organic wax mixture About 53.3 parts of an olefinic hydrocarbon having an average of 30 carbon atoms (available as Gulfteen 30+ and about 28.7 parts of the mercaptopolysiloxane copolymer prepared in (A) above are added to a reactor equipped with a stirrer and heated to a temperature of from 70° C. to 80° C. for 30 minutes. The resultant mixture is then cooled to room temperature. The resultant product has a melting point range of from 59° to 65° C. and an SH of 1.18 weight percent. Nuclear Magnetic Analysis indicates a $CH_2$ to $OSi(CH_3)_2$ ratio of 72.0 to 1.0.

EXAMPLE 9

(A) Preparation of mercaptopolysiloxane copolymer

A mercaptopolysiloxane wax is prepared by adding to a reactor equipped with a stirrer, condenser, thermometer and moisture trap, 33.6 parts of a silane of the formula $$C_nH_{2n+1}\overset{\overset{\displaystyle CH_3}{|}}{Si}(OCH_3)_2$$

where n has an average value of 42, 47.4 parts of 3-mercaptopropyltrimethoxysilane, 84 parts of hexamethylcyclotrisiloxane, 26.5 parts of hexamethyldisiloxane and 36 parts of xylene and then heating the reactants to a temperature of 72° C. About 60 parts of water and 2 parts of acid clay (available from Filtrol Corporation as Filtrol-13) are then added to the reactor. The reactants are heated to a temperature of about 150° C., while removing the azeotrope. The contents of the reactor are cooled to about 50° C., then about 10 parts of celite are added and the mixture filtered.

The filtrate is then vacuum stripped up to 155° C. at less than 1 torr. The resultant product melts in a temperature range of from 63° to 92° C. and has an SH content of about 1.5 weight percent.

(B) Preparation of a disulfide containing organopolysiloxane wax

A disulfide containing organopolysiloxane wax is prepared by adding 150 parts of the organopolysiloxane wax prepared in accordance with Example 9(A) above to a reactor equipped with a stirrer, condenser, thermometer and moisture trap. The contents of the reactor are heated to 150° C. with an air sparge for 20.5 hours. The resultant wax is harder than the original organopolysiloxane wax and turns to a dark color. The wax has an SH content of less than 0.02 weight percent.

What is claimed is:

1. A solid sulfur containing organopolysiloxane wax having a melting point above 34° C. and containing (1) siloxane units of the formula $$R_a-\overset{\overset{\displaystyle (R^1)_b}{|}}{Si}O_{\frac{4-a-b}{2}}$$

(2) siloxane units of the formula $$\begin{pmatrix} SH \\ | \\ R^2 \end{pmatrix}_c \\ | \\ R_d SiO_{\frac{4-c-d}{2}}$$

(3) siloxane units of the formula $$R_e SiO_{\frac{4-e}{2}},$$

which is obtained by reacting a mercaptofunctional silane of the formula $$\begin{pmatrix} SH \\ | \\ R^2 \end{pmatrix}_c \\ | \\ R_d-Si(R^3)_{4-c-d}$$

with a mixture containing from 0.08 to 100 moles of an alkyl functional silane of the formula $$R_a-\overset{\overset{\displaystyle (R^1)_b}{|}}{Si}-(R^3)_{4-a-b}$$

per mole of mercaptofunctional silane, from 1 to 32 moles of a cyclic trisiloxane of the formula $$(R_2SiO)_3$$

per mole of mercaptofunctional silane and from 1 to 18 moles of an organodisiloxane of the formula $$(R_3Si)_2O$$

per mole of mercaptofunctional silane in the presence of water and a catalyst having a pKa value less than 1, in which R is a monovalent hydrocarbon radical having from 1 to 10 carbon atoms, $R^1$ is an alkyl radical linked to silicon with an SiC-bond which has an average of at least 25 carbon atoms, $R^2$ is a multivalent radical selected from the group consisting of a hydrocarbon radical having from 2 to 10 carbon atoms which is free of aliphatic unsaturation, a hydrocarbon ether and a hydrocarbon thioether, $R^3$ is selected from the group consisting of a hydrocarbonoxy radical having from 1 to 10 carbon atoms and a halogen, a is an integer of from 0 to 2, b is an integer of 1 or 2, the sum of a+b is 1, 2 or 3, c is an integer of 1 or 2, d is an integer of from 0 to 2, and the sum of c +d is 1, 2 or 3, and e is 2 or 3.

2. The organopolysiloxane wax of claim 1, wherein $R^3$ is halogen.

3. The organopolysiloxane wax of claim 1, wherein the alkyl functional silane is obtained from the reaction of an olefinic hydrocarbon having an average of at least 25 carbon atoms with a silane of the formula $$(H)_b\overset{\overset{\displaystyle R_a}{|}}{Si}(R^3)_{4-a-b}$$

where R is a monovalent hydrocarbon radical having from 1 to 10 carbon atoms, $R^3$ is a hydrocarbonoxy radical having from 1 to 10 carbon atoms, a is an integer of from 0 to 2, b is an integer of 1 or 2 in the presence of a catalyst which promotes the addition of the Si-bonded hydrogen to a carbon-carbon double bond of the olefinic hydrocarbon.

4. The organopolysiloxane wax of claim 1, wherein the mercaptofunctional silane is 3-mercaptopropyltrimethoxysilane.

5. The organopolysiloxane wax of claim 1, wherein the mercaptofunctional silane and mixture containing an alkyl functional silane, a cyclic trisiloxane and organodisiloxane are reacted at a temperature of from 40° to 250° C.

6. A process for preparing disulfide containing organopolysiloxanes which comprises heating the organopolysiloxane wax of claim 1, which is obtained from the reaction of an alkyl functional silane, cyclic trisiloxane, organodisiloxane and mercaptofunctional silane to a temperature of at least 125° C. in the presence of oxygen.

* * * * *